United States Patent
Tran et al.

(10) Patent No.: US 9,756,435 B2
(45) Date of Patent: *Sep. 5, 2017

(54) DYNAMIC NEGOTIATION AND DISCOVERY OF HEARING AID FEATURES AND CAPABILITIES BY FITTING SOFTWARE TO PROVIDE FORWARD AND BACKWARD COMPATIBILITY

(71) Applicant: Starkey Laboratories, Inc., Eden Prairie, MN (US)

(72) Inventors: David H. Tran, Plymouth, MN (US); Kristopher Knight, Scottsdale, AZ (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,501

(22) Filed: Nov. 23, 2015

(65) Prior Publication Data

US 2016/0212553 A1    Jul. 21, 2016

Related U.S. Application Data

(63) Continuation of application No. 13/937,022, filed on Jul. 8, 2013, now Pat. No. 9,197,972.

(51) Int. Cl.
   *H04R 25/00*     (2006.01)
   *G06F 9/445*     (2006.01)

(52) U.S. Cl.
   CPC ............ *H04R 25/70* (2013.01); *G06F 8/65* (2013.01); *H04R 25/30* (2013.01); *H04R 25/558* (2013.01); *H04R 2225/55* (2013.01)

(58) Field of Classification Search
   CPC ........ H04R 25/60; H04R 25/65; H04R 25/70; H04R 25/356; H04R 25/456;
   (Continued)

(56) References Cited

U.S. PATENT DOCUMENTS 6,044,408 A  *  3/2000  Engstrom ............. G06F 13/105
                                               719/328
6,115,478 A      9/2000  Schneider
                 (Continued)

FOREIGN PATENT DOCUMENTS

EP      1727393 A1    11/2006
EP      2549397 A1     1/2013
                 (Continued)

OTHER PUBLICATIONS

"A beginners guide to SNMP", [Online]. Retrieved from the Internet: <URL: http://www.snmplink.org/snmparticles/abeginnersguide/ >, (2015), 3 pgs.
(Continued)

*Primary Examiner* — Brian Ensey
(74) *Attorney, Agent, or Firm* — Schwegman Lundberg & Woessner, P.A.

(57) ABSTRACT

A method to determine if a feature of a hearing assistance device may include transmitting, from a hearing assistance device application to a hearing assistance device, a request to determine if a feature is supported by the hearing assistance device; receiving, from the hearing assistance device, a response message identifying the feature as supported by the hearing assistance device; determining that the feature of the hearing assistance device is supported by the hearing assistance device application; and based on the determination, configuring the hearing assistance device application to control the feature of the hearing assistance device.

20 Claims, 6 Drawing Sheets

(58) Field of Classification Search
CPC .. H04R 25/502; H04R 25/505; H04R 25/552; H04R 25/554; H04R 25/558; H04R 25/652; H04R 2225/021; H04R 2225/025; H04R 2225/63; H04R 2225/41
USPC ............... 381/312, 314, 315, 327, 328, 330
See application file for complete search history.

(56) References Cited

U.S. PATENT DOCUMENTS

| | | | |
|---|---|---|---|
| 6,741,712 | B2 | 5/2004 | Bisgaard |
| 7,779,153 | B2 | 8/2010 | Van Den Heuvel et al. |
| 8,477,975 | B2 | 7/2013 | Glatt et al. |
| 8,503,703 | B2 * | 8/2013 | Eaton ................... H04R 25/554 381/312 |
| 9,197,972 | B2 | 11/2015 | Tran et al. |
| 9,485,591 | B2 | 11/2016 | Edgar et al. |
| 2005/0249368 | A1 | 11/2005 | Menzl et al. |
| 2006/0205349 | A1 | 9/2006 | Passier et al. |
| 2011/0059769 | A1 | 3/2011 | Brunolli |
| 2013/0329924 | A1 | 12/2013 | Fleizach et al. |
| 2015/0010159 | A1 | 1/2015 | Tran et al. |
| 2016/0173996 | A1 | 6/2016 | Edgar et al. |

FOREIGN PATENT DOCUMENTS

| | | |
|---|---|---|
| WO | WO-0057672 A2 | 9/2000 |
| WO | WO-0235884 A2 | 5/2002 |
| WO | WO-2006136616 A2 | 12/2006 |
| WO | WO-2008071231 A1 | 6/2008 |
| WO | WO-2014094859 A1 | 6/2014 |

OTHER PUBLICATIONS

"U.S. Appl. No. 13/937,022, Non Final Office Action mailed Jan. 6, 2015", 8 pgs.
"U.S. Appl. No. 13/937,022, Notice of Allowance mailed Jun. 23, 2015", 5 pgs.
"U.S. Appl. No. 13/937,022, Response filed Jun. 8, 2015 to Non Final Office Action mailed Jan. 6, 2015", 8 pgs.
"Bluetooth: Technology Overview: Profiles Overview", [Online]. Retrieved from the Internet: <URL: http://developer.bluetooth.org/KnowledgeCenter/TechnologyOverview/Pages/Profiles.aspx >, (2011), 2 pgs.
"European Application Serial No. 14175915.9, Extended European Search Report mailed Nov. 5, 2014", 11 pgs.
"European Application Serial No. 14175915.9, Response filed Jul. 14, 2015 to Extended European Search Report mailed Nov. 5, 2014", 19 pgs.
"U.S. Appl. No. 14/566,052, Non Final Office Action mailed Dec. 3, 2015", 8 pgs.
"U.S. Appl. No. 14/566,052, Response filed Mar. 2, 2016 to Non Final Office Action mailed Dec. 3, 2015", 7 pgs.
"U.S. Appl. No. 14/566,052, Notice of Allowance mailed Jun. 29, 2016", 5 pgs.
"European Application Serial No. 15199410, Extended European Search Report mailed May 10, 2016", 7 pgs.
"U.S. Appl. No. 15/339,047, Preliminary Amendment filed Jan. 17, 2017", 5 pgs.
"European Application Serial No. 14175915.9, Communication Pursuant to Article 94(3) EPC mailed Nov. 18, 2015", 5 pgs.
"European Application Serial No. 14175915.9, Response filed Sep. 4, 2016 to Communication Pursuant to Article 94(3) EPC mailed Nov. 18, 2015", 7 pgs.

* cited by examiner

DYNAMIC NEGOTIATION AND DISCOVERY OF HEARING AID FEATURES AND CAPABILITIES BY FITTING SOFTWARE TO PROVIDE FORWARD AND BACKWARD COMPATIBILITY

CLAIM OF PRIORITY

This application is a continuation of U.S. patent application Ser. No. 13/937,022, filed Jul. 8, 2013, and published as U.S. 2015-0010159 on Jan. 8, 2015, which application is incorporated herein by reference in its entirety.

TECHNICAL FIELD

This patent document pertains generally to communication with hearing assistance devices, and more particularly, but not by way of limitation, to dynamic negotiation and discovery of hearing aid features and capabilities by fitting software to provide forward and backward compatibility.

BACKGROUND

Hearing assistance devices, such as hearing aids, have firmware that enables the hearing assistance device to perform signal processing on incoming audio and output it for a user. Additionally, a user may utilize fitting software to configure the hearing assistance device.

BRIEF DESCRIPTION OF DRAWINGS

Some embodiments are illustrated by way of example and not limitation in the figures of the accompanying drawings in which.

DETAILED DESCRIPTION

The following detailed description of the present subject matter refers to subject matter in the accompanying drawings which show, by way of illustration, specific aspects and embodiments (also referred to as examples) in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Hearing assistance devices may have their various settings configured and read by an application such as fitting software. However, a technical problem may occur when the firmware and fitting software become incompatible. For example, the hearing assistance device may be released after the fitting software and the fitting software may lose the ability to communicate with the hearing assistance device because the fitting software has no knowledge of the features of the hearing assistance device. This may be true even though many of the features of the hearing assistance device may not have changed. In other words, forward and backward capability may be lost. As described in various examples herein, a technical solution to this problem may be for the fitting software and hearing assistance device to communicate with each other and find common versions of features available allowing the fitting software to configure/read features of the hearing assistance device even though the hearing assistance device has been updated with new versions of a feature.

Digital hearing assistance devices use firmware to configure the hardware of the hearing assistance device to perform the functions of the hearing assistance device. For example, the firmware may instruct the hardware to take an input sound signal from a microphone in the hearing assistance device and process it according to instructions in the firmware and finally to output the processed signal to a speaker, transducer, or the like. Different instructions may enable different features of a hearing assistance device. For example, a set of instructions may enable a noise cancellation feature while another set of instruction may enable the digital hearing assistance device to connect with an audio transmitter attached to a wearer's television. Other features may include, but are not limited to, eliminating buzzing and whistling, speech enhancement in noisy environments, connecting with a mobile phone, and replicating hard to hear high frequencies in lower frequencies.

In various examples, features may be enabled, disabled, or adjusted using an application executing on a processor (e.g., hearing aid fitting software). In an embodiment, the fitting software uses a priori knowledge of the hearing assistance device's memory map to ascertain the firmware capabilities of the hearing assistance device. Capabilities may include which features and options for those features are available for the fitting software to read or adjust. One potential drawback to this approach is that the fitting software may need to be updated to accommodate any modifications to the memory map such as new hearing assistance device firmware capabilities, removed firmware capabilities, memory address changes, etc. If the fitting software is not updated, then it may be incompatible with the new hearing assistance device firmware.

In an example, compatibility between the firmware and fitting software may be maintained without a priori knowledge of the hearing assistance device's memory map. For example, the fitting software may interrogate the hearing assistance device to discover its capabilities dynamically. The fitting software may then determine which features can be supported and not supported. Furthermore, older versions of the fitting software may support a subset of the hearing assistance device's features while not forcing users to upgrade the fitting software to read the hearing assistance device. The newest versions of the fitting software may then include updates to support the new hearing assistance device's features. In an example, the hearing assistance device may transmit its capabilities without being interrogated by the fitting software (e.g., automatically upon connection).

Figure 1:
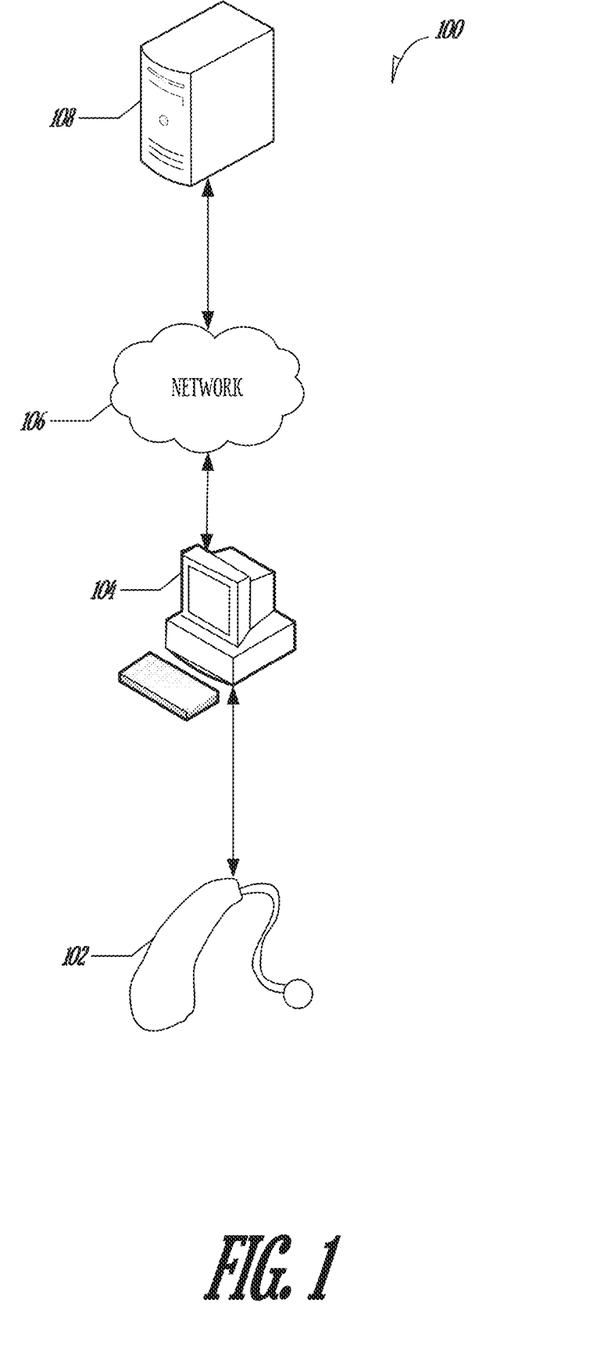
FIG. 1 illustrates an overview diagram of dynamic capability discovery of a hearing assistance device, according to example embodiment.

FIG. 1 illustrates an example overview diagram 100 of dynamic capability discovery of a hearing assistance device. Diagram 100 includes software server 108, network 106, computing device 104, and hearing assistance device 102. In various embodiments, computing device 104 and software server 108 communicate via network 106. Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. Network 106 may include a single local area network (LAN) or wide-area network (WAN), or combinations of LAN's or WAN's, such as the Internet. The various devices coupled to network 106 may be coupled to network 106 via one or more wired or wireless connections.

In an example, fitting software and firmware may be downloaded from software server 108. For example, an initial version of the fitting software may be downloaded to computing device 104. Additionally, upon purchasing a hearing assistance device, firmware is installed on the hearing device. Over time, both the fitting software and firmware may be updated independently via downloads from software server 108. In various examples, the firmware of the hearing assistance device may also be updated when a wearer of the hearing device visits an audiologist.

Computing device 104 may be a personal computer or mobile device. In an embodiment, computing 104 stores a client program (e.g., fitting software) to interface with hearing assistance device 102. The client program may be commercial software, custom software, open source software, freeware, shareware, or other types of software packages. In an embodiment, the client program includes a thin client designed to provide query and data manipulation tools for a user of computing device 104. For example, the fitting software may be stored on an external server (e.g., software server 108) and a browser running on computing device 104 may present the software interfaces to a user to interact with hearing assistance device 102, which may be connected to computing device 104. The client program may interact with a server program hosted by, for example, software server 108. In various examples, the client program on computing device 104 and hearing assistance device 102 communicate using one or more wired or wireless connections (e.g., over a USB connection, Bluetooth, etc.).

Figure 2:
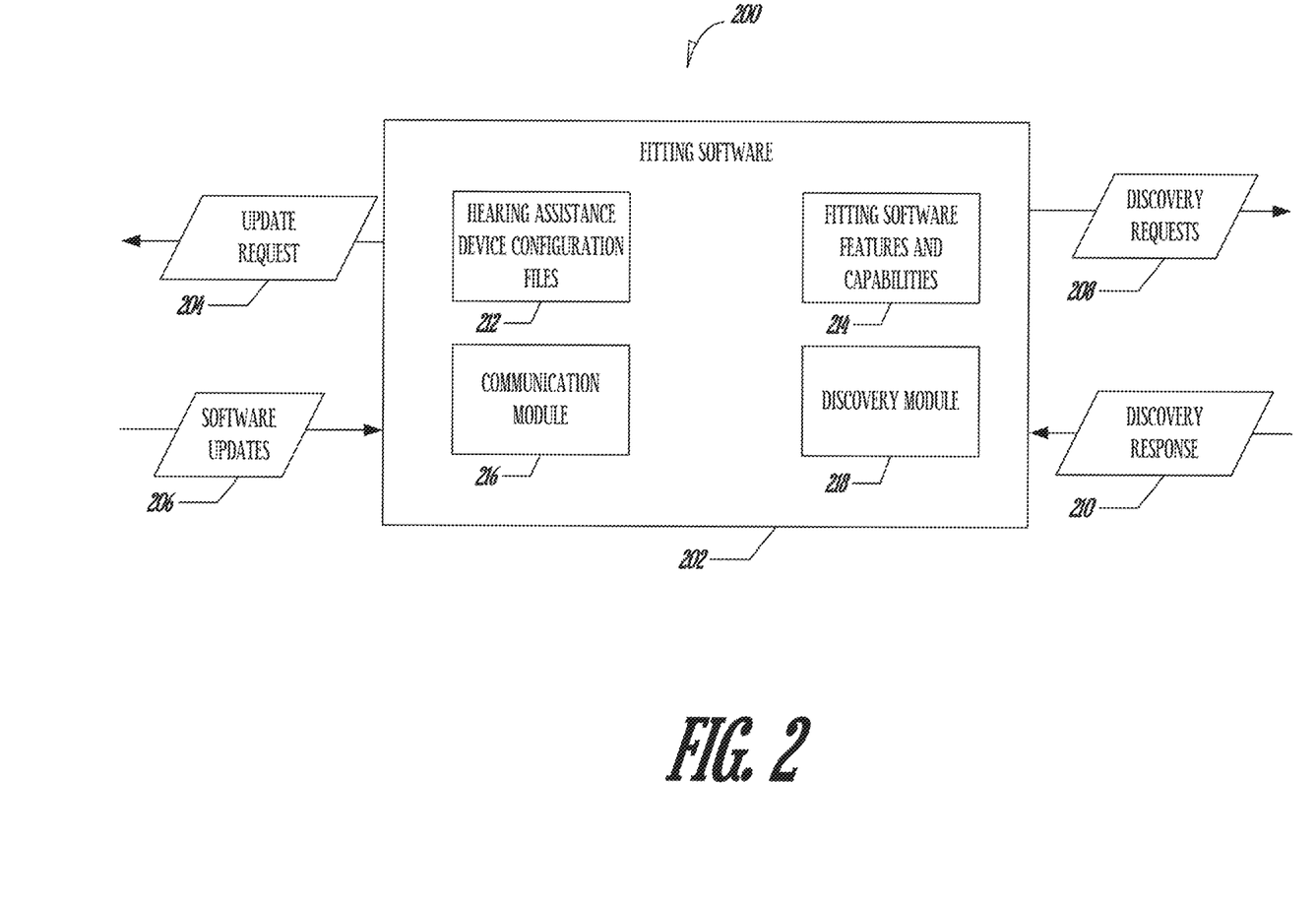
FIG. 2 is a diagrammatic representation of fitting software, according to an example embodiment.

FIG. 2 is a diagrammatic representation 200 of fitting software 202, according to an example embodiment. As illustrated fitting software 202 includes hearing assistance device configuration files 212, fitting software features and capabilities 214, communication module 216, and discovery module 218. Inputs and outputs to fitting software 202 may include update request 204, software updates 206, discovery requests 208, and discovery response 210.

In various examples, fitting software 202 may maintain data on the various capabilities and features that are supported by fitting software 202 in addition to hearing assistance devices that have communicated with fitting software 202. The data may be organized in numerous ways without departing from the scope of this disclosure. For example, the fitting software features and capabilities 214 may be stored in separate files or locations than hearing assistance device configuration files 212. The data may be organized in a database (flat file, relational, non-relational) or a structured file (e.g., XML).

Figure 3:
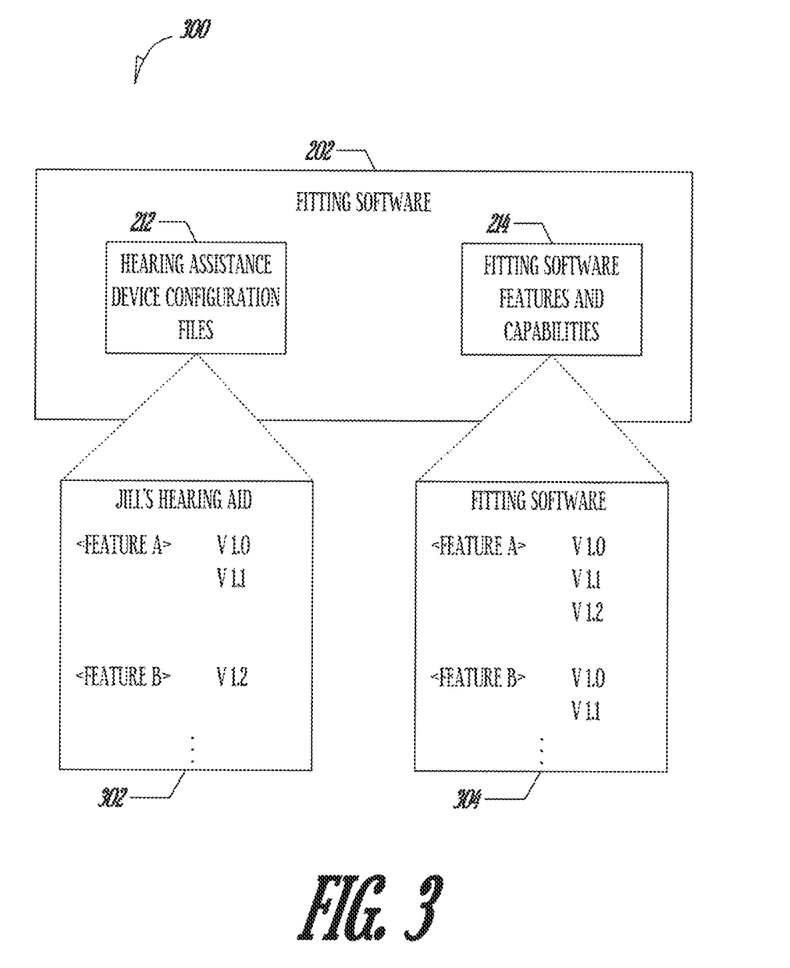
FIG. 3 illustrates another view of hearing assistance device configuration 212 and fitting software features and capabilities, according to an example embodiment.

FIG. 3 illustrates another view of hearing assistance device configuration files 212 and fitting software features and capabilities 214, according to an example embodiment. Hearing assistance device configuration file 302 is a representation of information that may be stored about capabilities and features supported by the firmware of a hearing assistance device. As illustrated, configuration file 302 is for a hearing aid and has the title "Jill's Hearing Aid." The title is for illustration purposes and in various examples, the hearing assistance devices do not have titles; however, each hearing assistance device may have an identification such that fitting software 202 may retrieve the capabilities and features supported by a specific hearing assistance device.

Configuration file 302 illustrates two features, "Feature A" and "Feature B." Further illustrated is that "Jill's Hearing Aid" supports versions "1.0" and "1.1" of "Feature A" but only supports version "1.2" of "Feature B." This level of support may be compared to fitting software configuration file 304 in which versions "1.0", "1.1", and "1.2" are supported for "Feature A" and versions "1.0" and "1.1" are supported for "Feature B." Accordingly, in an example, fitting software 202 may be configured to communicate with "Jill's Hearing Aid" about "Feature A" using version "1.1", which is the highest common version between the hearing aid and the fitting software. In contrast, fitting software 202 may be unable to communicate with "Jill's Hearing Aid" about "Feature B" as there is no common version.

The information of configuration file 302 may be stored in a number of ways. For example, an individual file may be stored for each hearing assistance device. Within an individual file there may be a list of features/capabilities and associated supported versions (e.g., configuration file 302) and for each feature/capability a flag (e.g., a 'use' parameter to true) may be set that indicates which version of the feature is to be used by the fitting software. For example, when a user connects a hearing assistance device to his or her computer, fitting software 202 may retrieve the configuration file associated with the connected hearing assistance device and configure the fitting software accordingly. If a configuration file is not present, a new configuration file may be created. If a feature of the hearing assistance device is not supported by the fitting software, a message may be presented (e.g., displayed) to the user indicating the incompatibility and prompting the user to update the fitting software or firmware of the hearing assistance device.

In various examples, instead of, or in addition to using configuration files, a database may be used that has row entries for each hearing assistance device and columns for each feature/capability. At the intersection of a feature and hearing assistance device a value may be set indicating which version is compatible with the software and hearing assistance device or, when there is no compatibility, a NULL value (or other value indicating no compatibility). The compatible versions in the database of individual files may be updated automatically each time the hearing assistance device is connected or by user initiation of the feature/compatibility discovery process (e.g., automatic discovery has been turned off).

Referring back to FIG. 2, in various examples, communications module 206 may be a hardware-implemented module that includes a processor configured by a set of instructions. For example, the configured processor may instruct a network device (e.g., a Bluetooth transceiver or network interfaced card) to transmit update request 204 to software server 108 and transmit discovery request 208 to hearing assistance device 102. Similarly, communications module 206 may receive, via one or more network devices, software updates 206 and discovery response 210.

In various examples, discovery module 218 may be a hardware-implemented module that includes a processor configured by a set of instructions. For example, the configured processor may detect that a hearing assistance device has been connected to a computing device (e.g., computing device 104). Upon detecting that the hearing assistance device is connected, discovery module 218 may format discovery request 208 and instruct communications module to transmit discovery request 208 to the connected hearing assistance device. Discovery request 208 may include a request for the hearing assistance device to response with a message indicating what the capabilities/features of the hearing assistance device are included in the hearing assistance device's firmware as well as version information of the capabilities/features.

In an example, the discovery module 218 also parses discovery response 210. For example, discovery response message 210 may include what capabilities/features of the hearing assistance device are supported by the hearing assistance device's firmware as well as version information of the capabilities/features. Discovery module 218 may use the included information and update a database or configuration files for the hearing assistance device as indicated previously. Discovery module 218 may also configure the fitting software to control the features of the hearing assistance device.

Figure 4:
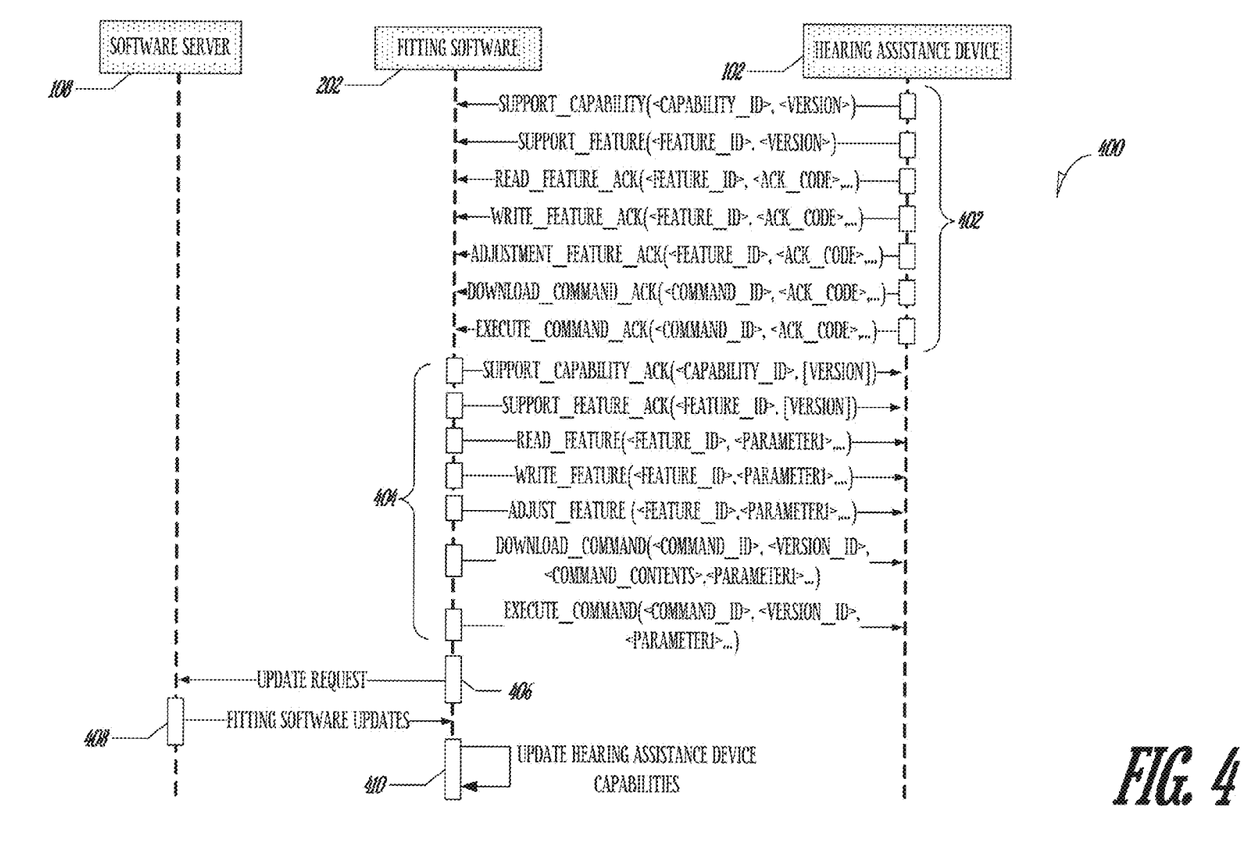
FIG. 4 is a data flow diagram, according to an example embodiment

FIG. 4 is a data flow diagram 400, according to an example embodiment. The messages depicted flow between software server 108, fitting software 202, and hearing assistance device 102. The order of message flown is for illustration purposes and should not be used to indicate a required order of messages that are exchanged. The names of the message calls and variables are also for illustration purposes, and other names may be used without departing from the scope of this disclosure. Additionally, while "Fitting Software" is used in the examples below, other applications may similarly transmit and receive responses from a hearing assistance device (e.g., third-party developed applications). Also, messages beyond those depicted in FIG. 4 may be exchanged between fitting software 202 and hearing assistance device 102.

In various examples, the first set of messages, 402, are messages that may be transmitted from hearing assistance device 102 to fitting software 202 and messages 404 may be message transmitted from fitting software 202 to hearing assistance device 102. The format and specific function calls of messages 402/404 may be set according to an application programming interface (API) that is known to the fitting software and hearing assistance device. In an example, "feature_id", "capability_id", "command_id", "parameter1" etc., may be identifications that are known both to fitting software 202 and hearing assistance device 102. Other identifications may also be used such as a feature name, capability name, and so forth.

In an example, the "Support_Capability(<capability_id>, <version>)" message may be used by the hearing assistance device to communicate which capabilities the hearing assistance device can support from a hardware perspective. Such capabilities may include, but are not limited to, the type of volume control, whether there is a Direct Audio Input connector, the output characteristics of the amplifier/receiver and so on. Capabilities may have an associated version for configuration management purposes that is transmitted in the message. In an example, the message is transmitted in response to a discovery message from the fitting software. In an example, the message is transmitted upon a connection being established between the fitting software and hearing assistance device. In an example, the "Support_Capability (<capability_id>, <version>)" message may be considered a discovery response message.

In an example, the "Support_Feature(<feature_id>, <version>)" message communicates which features the hearing assistance device can support from a software/firmware perspective. Such features may include, but are not limited to, the type of frequency translation, environmental audio quality, firmware upgrade and so on. Features may have an associated version for configuration management purposes. In an example, the message is transmitted in response to a discovery message from the fitting software. In an example, the message is transmitted upon a connection being established between the fitting software and hearing assistance device. In an example, the "Support_Feature (<feature_id>, <version>)" message may be considered a discovery response message. In various examples, "Support_Capability" and "Support_Feature" messages may include more than capability/feature in the response, as well as more than supported version of the capabilities and features.

In an example, the "Read_Feature_ACK(<feature_id>, <ack_code>, . . . )" message may be sent in response to a message from the fitting software to read or poll the current values of a particular feature designated by the feature ID. There may be additional parameters (designated by the " . . . ") depending on the feature. The "Read_Feature_ACK" message may acknowledge that the message from the fitting software was received and processed. The "Read_Feature_ACK" message may also contain error codes to notify the fitting software that there was an error, and the received message could not be processed.

In an example, the "Write_Feature_ACK(<feature_id>, <ack_code>, . . . )" message may be sent in response to a message from the fitting software to write or modify one or more of the current values (i.e. parameters) of a particular feature designated by the feature ID. There may be additional parameters (designated by the " . . . ") depending on the feature. The "Write_feature_ACK" message may acknowledge that the message from the fitting software was received and processed. The "Write_feature_ACK" message may also contain error codes to notify the fitting software that there was an error, and the message could not be processed.

In an example, the "Adjust_Feature_ACK (<feature_id>, <ack_code>, . . . )" message may be in response to a message from the fitting software to adjust one or more existing parameters (e.g. increase volume) of a particular feature designated by the feature ID. There may be additional parameters (designated by the " . . . ") depending on the feature. The "Adjust_Feature_ACK" message may be used to acknowledge that the message was received and processed. The "Adjust_Feature_ACK" message may also contain error codes to notify the fitting software that there was an error, and the command could not be processed.

In an example, the "Download_Command_ACK(<command_id>, <ack_code>, . . . )" message may be sent in response to a message from the fitting software to download a particular command from the fitting software. There may be additional parameters (designated by the " . . . ") depending on the command. The "Download_Command_ACK" message may be used to acknowledge that the message from the fitting software was received and processed. The "Download_Command_ACK" message may also contain error codes to notify the fitting software that there was an error, and the message from the fitting software could not be processed.

In an example, the "Execute_Command_ACK(<command_id>, <ack_code>, . . . )" message is sent in response to a message from the fitting software to execute a particular command that has been downloaded. There may be additional parameters (designated by the " . . . ") depending on the command. The "Execute_Command_ACK" may be sent to acknowledge that the message was received and processed. The "Execute_Command_ACK" message may also contain error codes to notify the fitting software that there was an error, and the message could not be processed.

In an example, the "Support_Capability_ACK(<capability_id>, [version])" This message may acknowledge receipt of the message from the hearing assistance device for the capability designated by the capability ID. The optional version may be echoed to the hearing assistance device for confirmation.

In an example, the "Support_Feature_ACK (<feature_id>, [version])" message may be sent to acknowledges receipt of the message from the hearing assistance device for the feature designated by the feature ID. The optional version may be echoed to the hearing assistance device for confirmation.

In an example, the "Read_Feature(<feature_id>,<parameter1>, . . . )" may be used to query or poll the hearing assistance device for the current parameter values associated with the particular feature designated by feature ID. In an example, the "Write_Feature(<feature_id>,<parameter1>, . . . )" message may be used by the fitting software to send an updated set of parameter values to the hearing assistance device for a feature designated by feature ID. In various examples, one or more parameters may be associated with a particular feature.

In an example, the "Adjust_Feature(<feature_id>,<parameter1>, . . . )" message may be used by the fitting software to send adjustments for the current parameter values for a feature designated by feature ID. One or more parameters may be associated with a particular feature. The Adjust command may differ from the Write in that the adjustments may be relative (e.g. increase or decrease value) vs. compared with being absolute (replace this parameter with value "12"). In various examples, the read, write, and adjust message may be transmitted to hearing assistance device 102 in a format according to a version of the feature supported by the hearing assistance device.

In an example, the "Download_Command (<command_id>,<version_id>,<command_contents>,<parameter1>, . . . )" message may be sent by the fitting software to request that the hearing assistance device download a particular command. The actual command contents may be embedded in the message or may be in a separate message. One or more parameters may be associated with a particular feature.

In an example, the "Execute_Command (<command_id>, <version_id>,<parameter1>, . . . )" message may be sent by the fitting software to request that the hearing assistance device execute a particular command that has been downloaded by the hearing assistance device. One or more parameters may be associated with a particular feature.

In various examples, in response to the various messages between fitting software 202 and hearing assistance device 102, fitting software 202 may update (410) the capabilities/features supported by hearing assistance device 102. For example, when a "Support_Feature" message is received, fitting software 202 may retrieve the configuration file, as stored on the computing device, that indicates the capabilities and features of hearing assistance device 102. The configuration file may be edited in response to the relative capability/feature support changes of the hearing assistance device. For example, an entry of "Feature A" may edited to indicate that version 1.0 of "Feature A" is no longer supported by hearing assistance device 102. Similarly, user interfaces of the fitting software may be updated to reflect values of the parameters of the various features of the hearing assistance device and the availability of features on the hearing assistance device.

Messages between fitting software 202 and software server 108 may also be communicated. For example, fitting software 202 may send an update request message 406 to software server 108 to see if any updates are available for the fitting software. In an example, upon parsing a discovery response message and determining that the fitting software is compatible with a feature of a hearing assistance device, update request 406 be transmitted to determine if a newer version of the fitting software supports the feature. If so, software server 108 may transmit fitting software updates 408 to fitting software 202. The updates may then be applied to the fitting software. Fitting software 202 may also update the database/configuration files related to the compatibility between the fitting software and hearing assistant devices (e.g., change a NULL value to a supported feature version).

Figure 5:
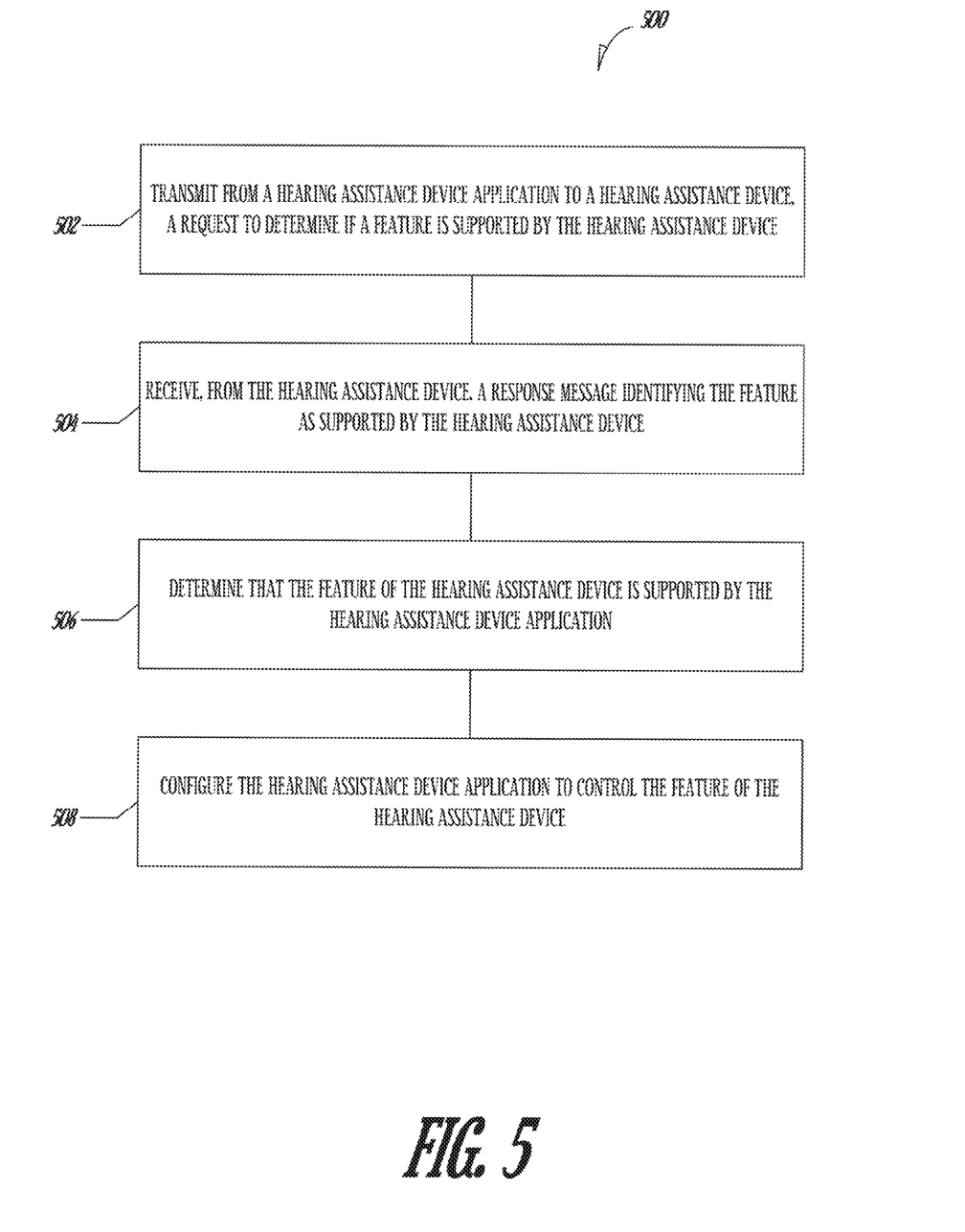
FIG. 5 is a flow chart illustrating a method to determine features supported by a hearing assistance device, according to an example embodiment.

FIG. 5 is a flow chart illustrating a method 500 to determine features supported by a hearing assistance device, according to an example embodiment. In an example, a request is transmitted from a hearing assistance device application to a hearing assistance device to determine if a feature is supported by the hearing assistance device (502). For example, the hearing assistance device application may be fitting software and the hearing assistance device may be a hearing aid. In an example, the request is a discovery request message as discussed in more detail above that is transmitted upon a hearing assistance device being connected to the hearing assistance device. In various examples, a similar message may be transmitted to determine the capabilities of the hearing assistance device or additional features.

In an example, a response message is received that identifies the feature as supported by the hearing assistance device (504). In an example, the response message is a discovery response message as discussed above. The response message may be parsed to identify a version of the feature that is supported by the hearing assistance device. The hearing assistance device application may be configured to control the feature with the version of the feature identified in the response message. For example, the hearing assistance device application may determine if the feature of the hearing assistance device is supported by the hearing assistance device application (506) and, based on determining that the feature is supported, configure the hearing assistance device application to control the feature of the hearing assistance device (508). In an example, the configuration is completed using discovery module 218 to determine which version of the feature to use in the configuration.

In an example, the configuration of the hearing assistance device application includes determining a common version of the feature that is supported by both the hearing assistance device and hearing assistance device application. The configuration may also include updating a configuration file for the hearing assistance device to indicate the feature and version of the feature as supported by the hearing assistance device. The configuration file may be associated (e.g., able to be read and edited) with the hearing assistance device application.

In various examples, an adjust feature request message may be transmitted from the hearing assistance device application to the hearing assistance device in accordance with a format supported by the version of the feature supported by the hearing assistance device. An acknowledgement message may be received from the hearing assistance device indicating that the feature was adjusted.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Example Machine Architecture and
Machine-Readable Medium

Figure 6:
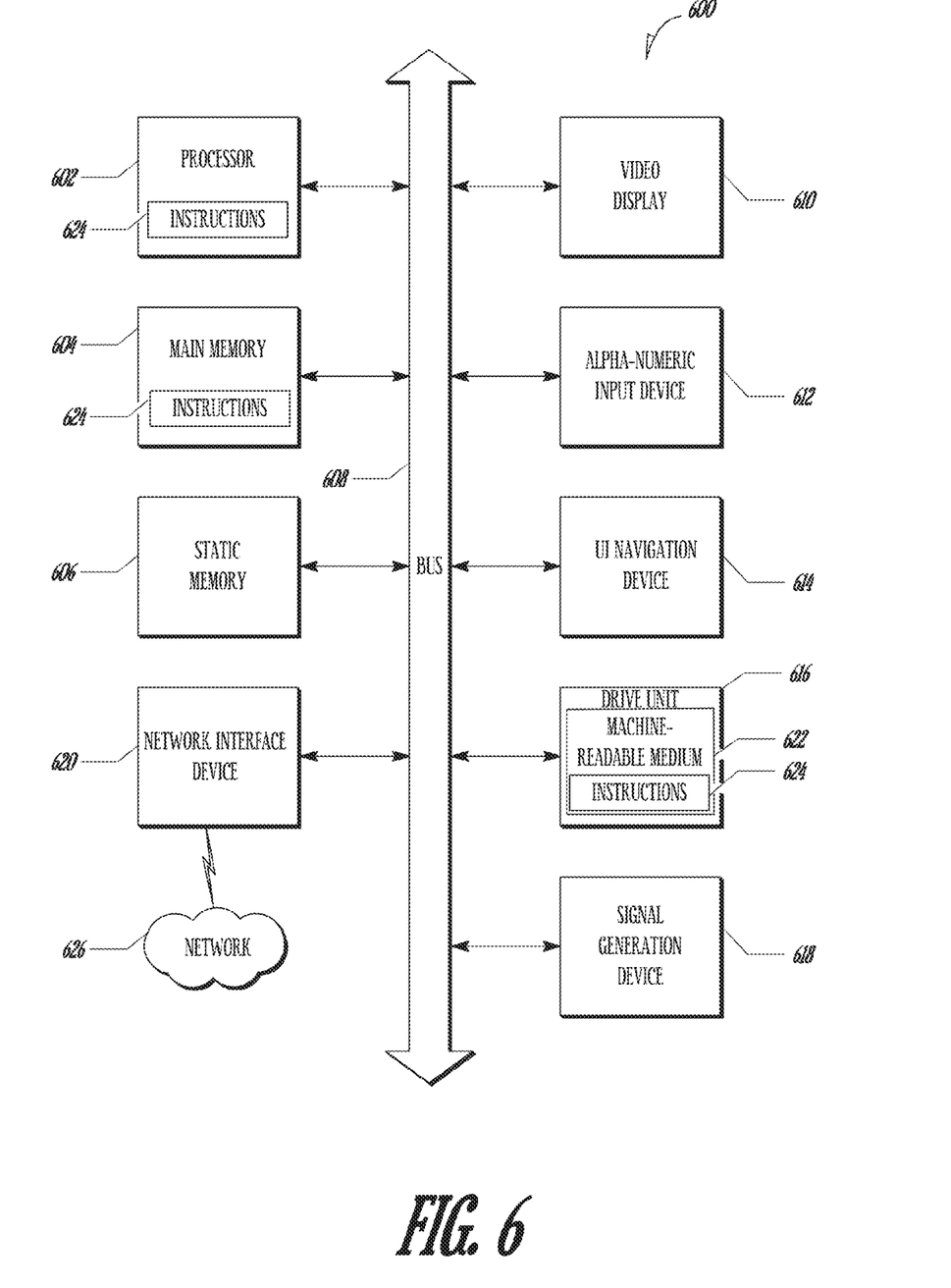
FIG. 6 is a block diagram of a machine in the example form of a computer system within which instructions, for causing the machine to perform any one or more of the methodologies discussed herein, may be executed.

FIG. 6 is a block diagram of a machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Various embodiments of the present subject matter support wireless communications with a hearing assistance device. In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in communications protocols, antenna configurations, and combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that digital hearing aids include a processor. In digital hearing aids with a processor programmed to provide corrections to hearing impairments, programmable gains are employed to tailor the hearing aid output to a wearer's particular hearing impairment. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled

What is claimed is:

1. A method comprising:
    transmitting, from a hearing assistance device application to a hearing assistance device, a request to determine if a hardware capability is supported by the hearing assistance device;
    receiving, from the hearing assistance device, a response message identifying the hardware capability as supported by the hearing assistance device;
    determining that the hardware capability of the hearing assistance device is supported by the hearing assistance device application; and
    based on the determination and response, configuring the hearing assistance device application to configure the hardware capability of the hearing assistance device.

2. The method of claim 1, further comprising:
    parsing the response message to identify a version of the hardware capability supported by the hearing assistance device; and
    configuring the hearing assistance device to configure the hardware capability with the version of the hardware capability identified in the response message.

3. The method of claim 2, further comprising:
    updating a configuration file for the hearing assistance device to indicate the hardware capability and version of the hardware capability as supported by the hearing assistance device, the configuration file associated with the hearing assistance device application.

4. The method of claim 3, further comprising:
transmitting, from the hearing assistance device application to the hearing assistance device, a request to determine if a second hardware capability is supported by the hearing assistance device;
receiving, from the hearing assistance device, a response message identifying the second hardware capability as not supported by the hearing assistance device; and
updating the configuration file to indicate the second hardware capability as not supported by the hearing assistance device.

5. The method of claim 3, the method further comprising:
determining if the configuration file for the hearing assistance device is created; and
if no configuration file is not present, creating the configuration file.

6. The method of claim 1, wherein the request includes a request to determine if a plurality of hardware capabilities are supported by the hearing assistance device.

7. The method of claim 1, wherein the request is transmitted in response to a connection being established between the hearing assistance device and fitting software for the hearing assistance device.

8. A system comprising:
at least one processor;
a storage device with computer-readable instructions stored thereon, which when executed by the at least one processor, configure the at least one processor to:
transmit, from a hearing assistance device application to a hearing assistance device, a request to determine if a hardware capability is supported by the hearing assistance device;
receive, from the hearing assistance device, a response message identifying the hardware capability as supported by the hearing assistance device;
determine that the hardware capability of the hearing assistance device is supported by the hearing assistance device application; and
based on the determination and response message, configure the hearing assistance device application to configure the hardware capability of the hearing assistance device.

9. The system of claim 8, wherein the storage device further stores instructions, which when executed by the at least one processor, configure the at least one processor to:
parse the response message to identify a version of the hardware capability supported by the hearing assistance device; and
configure the hearing assistance device to control the hardware capability with the version of the hardware capability identified in the response message.

10. The system of claim 8, wherein the storage device further includes a configuration file for the hearing assistance device, the configuration file indicating which version of the hardware capability is supported by the hearing assistance device.

11. The system of claim 8, wherein the hearing assistance device and hearing assistance device application are connected via a wireless connection.

12. The system of claim 11, wherein the request is transmitted to the hearing assistance device upon the wireless connection being established between the hearing assistance device application and the hearing assistance device.

13. The system of claim 8, wherein the hearing assistance device is a hearing aid.

14. The system of claim 8, wherein the hearing assistance device application is fitting software configured to adjust parameters of the hearing assistance device according to the features supported by both the hearing assistance device and hearing assistance device application.

15. A computer-readable storage device comprising instructions, which when executed by at least one processor, configure the at least one processor to:
transmit, from a hearing assistance device application to a hearing assistance device, a request to determine if a hardware capability is supported by the hearing assistance device;
receive, from the hearing assistance device, a response message identifying the hardware capability as supported by the hearing assistance device;
determine that the hardware capability of the hearing assistance device is supported by the hearing assistance device application; and
based on the determination and response message, configure the hearing assistance device application to configure the hardware capability of the hearing assistance device.

16. The computer-readable storage device of claim 15, wherein the instructions further configure the at least one processor to:
parse the response message to identify a version of the hardware capability supported by the hearing assistance device; and
configure the hearing assistance device to configure the hardware capability with the version of the hardware capability identified in the response message.

17. The computer-readable storage device of claim 16, wherein the instructions further configure the at least one processor to:
update a configuration file for the hearing assistance device to indicate the hardware capability and version of the hardware capability as supported by the hearing assistance device, the configuration file associated with the hearing assistance device application.

18. The computer-readable storage device of claim 15, wherein the instructions further configure the at least one processor to:
transmit, from the hearing assistance device application to the hearing assistance device, a request to determine if a second hardware capability is supported by the hearing assistance device;
receive, from the hearing assistance device, a response message identifying the second hardware capability as not supported by the hearing assistance device; and
update the configuration file to indicate the second hardware capability as not supported by the hearing assistance device.

19. The computer-readable storage device of claim 15, wherein the request includes a request to determine if a plurality of hardware capabilities are supported by the hearing assistance device.

20. The computer-readable storage device of claim 15, wherein the request is transmitted in response to a connection being established between the hearing assistance device and fitting software for the hearing assistance device.

* * * * *